United States Patent [19]

Alley et al.

[11] Patent Number: 5,091,817

[45] Date of Patent: Feb. 25, 1992

[54] AUTONOMOUS ACTIVE CLAMP CIRCUIT

[75] Inventors: Robert P. Alley, Clifton Park; Kevin C. Routh, Schenectady, both of N.Y.

[73] Assignee: General Electric Company, Schenectady, N.Y.

[21] Appl. No.: 136,501

[22] Filed: Dec. 28, 1987

Related U.S. Application Data

[63] Continuation of Ser. No. 677,413, Dec. 3, 1984, abandoned.

[51] Int. Cl.$^5$ .............................................. H02H 3/20
[52] U.S. Cl. .......................................... 361/56; 361/91; 361/111
[58] Field of Search .................. 361/54–60, 361/83, 86, 91, 111, 18, 6

[56] References Cited

U.S. PATENT DOCUMENTS

| | | | |
|---|---|---|---|
| 3,524,124 | 8/1970 | Perkinson | 361/91 X |
| 3,571,660 | 3/1971 | Phillips | 361/111 |
| 3,743,887 | 7/1973 | Keough et al. | 361/86 |
| 4,186,418 | 1/1980 | Seiler | 361/56 X |
| 4,277,811 | 7/1981 | Sato | 361/98 X |
| 4,321,644 | 3/1982 | Brasfield | 361/56 |
| 4,350,935 | 9/1982 | Spira et al. | 315/291 |
| 4,415,945 | 11/1983 | Periot | 361/100 |
| 4,423,457 | 12/1983 | Brajder | 361/98 X |
| 4,437,133 | 3/1984 | Rueckert | 361/33 |
| 4,600,963 | 7/1986 | Hertrich et al. | 361/98 X |

OTHER PUBLICATIONS

IEEE Standard Dictionary of Electrical and Electronics Terms, Third Edition, Copyright 1984, pp. 146–147.

Primary Examiner—Todd E. DeBoer
Attorney, Agent, or Firm—Marvin Snyder; James C. Davis, Jr.

[57] ABSTRACT

An autonomous active clamp circuit clamps voltage across an inductive load. The clamp closes when the voltage across it exceeds some value substantially above peak line voltage, conducts with a low voltage drop, and opens when the current going through it reaches nearly zero.

7 Claims, 1 Drawing Sheet

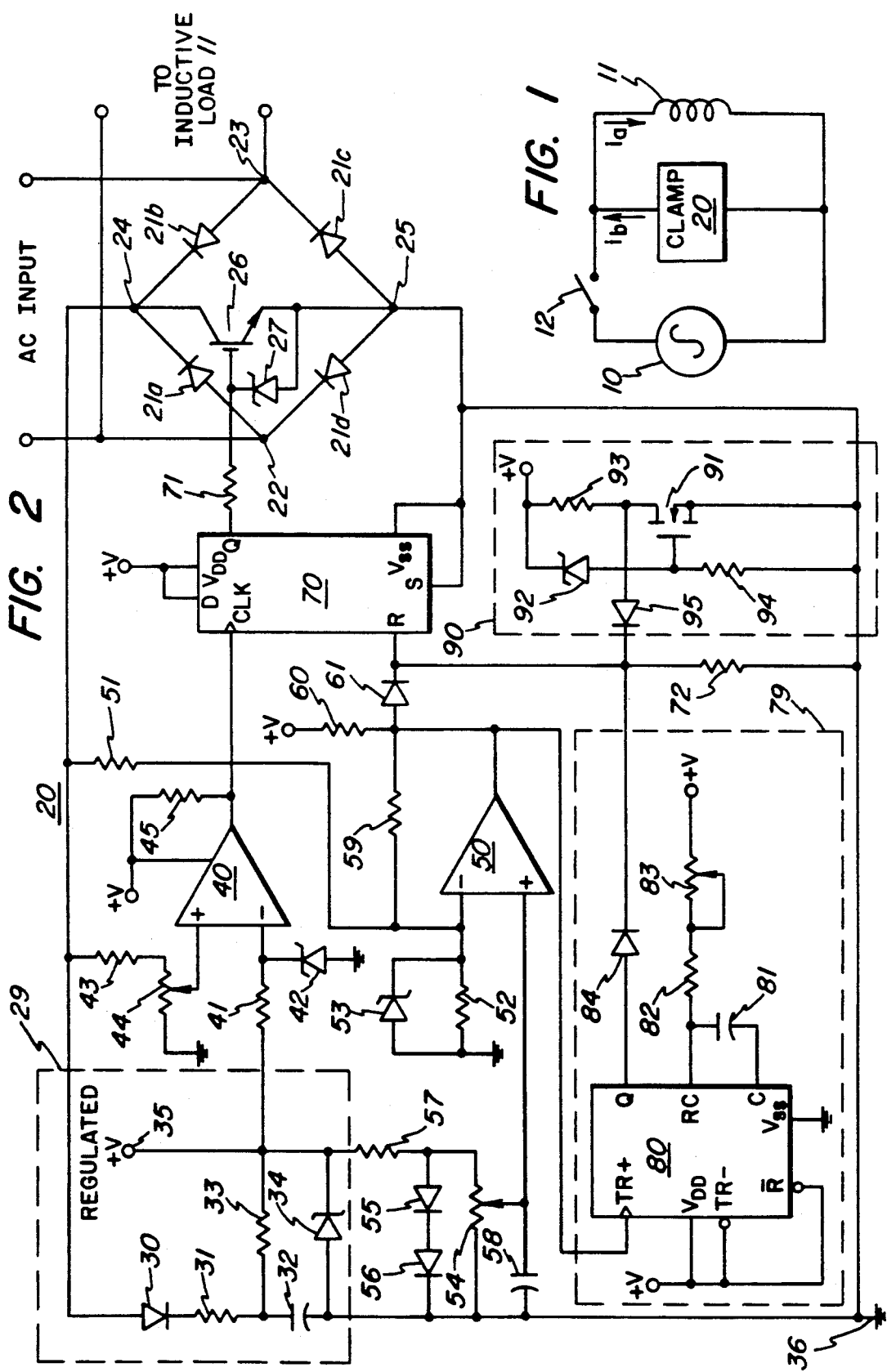

AUTONOMOUS ACTIVE CLAMP CIRCUIT

This application is a Continuation of application Ser. No. 677,413, filed Dec. 3, 1984 now abandoned.

The present invention relates in general to an active clamp circuit and more specifically to clamping transient voltages and reducing losses when switching inductive ac circuits.

BACKGROUND OF THE INVENTION

When switching current flowing to an inductive load it is not possible to turn off the current instantaneously because that would induce an infinite voltage across the inductor. Nevertheless, when current is switched off, the voltage across the inductor rises in an attempt to keep current flowing. Eventually, the voltage may reach a level that causes current flow by arcing across the switch. If the switch is a semiconductor device, a voltage exceeding its maximum collector to emitter voltage will cause breakdown, and hence destruction, of the device.

The device breakdown problem is solved in a dc circuit by using a flyback diode to clamp transient voltages and reduce switching losses. The flyback diode is reverse biased when the switch is on and goes into conduction when the switch is turned off, clamping the inductor voltage to one diode drop.

If the inductive load is driven from an ac source, clamping transient voltages is much more difficult since it is impossible to construct a bilateral flyback diode; that is, such a device would conduct on each half cycle when the switch is closed, and thus essentially act simply as a conductor. A transient suppressor such as a metal-oxide varistor, which behaves like a bilateral zener diode, may be used across the inductive load. Alternatively, an RC snubber network may be used across the inductive load. Another possible solution would be to reduce the switching speed so that the product of the inductance (L) and the rate of change of current (di/dt) is a practical number, although current flow for this longer period of time would increase the total switching losses. The use of a snubber or a varistor may be undesirable in applications where it is intended to use the current flowing from the inductor rather than dissipate the current. For example, the light output of fluorescent lamps may be dimmed by placing a switch in the power line and chopping the input waveform to the inductive ballast. The energy stored in the ballast primary may be transferred to the fluorescent lamps (i.e. through the ballast secondary) when the series power line switch is open by clamping the ballast primary voltage.

One known technique for clamping an inductive ac load is to shunt the inductive load with a controlled switch such that when the power line switch is open the shunt switch is closed, and vice versa. As a result, the control complexity of ac circuits is doubled since each switch is usually a unipolar switch connected to a bridge rectifier and must be transformer controlled or photovoltaically controlled. Furthermore, the opening times of the switches must be set long enough to keep L di/dt, the voltage rise across the inductor, within the device ratings of the circuit components.

Simultaneous switching of the shunt switch has the further disadvantage that phase differences occurring in the load as the series switch chops the line voltage at different rates or times are not accounted for. Thus, further complexity must be added to account for the phase differences and thereby hold voltage to less than an excessive level.

Yet another possible solution to this problem is to connect a sidac device across the inductive load. The sidac is a high voltage bilateral trigger device available from Motorola, Inc. The sidac clamps load voltage by breaking over when load voltage exceeds the sidac's trigger voltage. However, at sufficiently high rates of change of voltage the sidac fails to clear at current zero, shorting the line and destroying the line switch and itself.

OBJECTS OF THE INVENTION

It is a principal object of the present invention to provide a new and improved active clamp circuit which reduces losses and clamps transient voltages and which operates autonomously.

It is another object of the present invention to provide an active clamp circuit which closes when the voltage across it exceeds some predetermined value.

It is an additional object of the present invention to provide an active clamp circuit which conducts with a low voltage drop and which opens when the current going through it reaches zero.

SUMMARY OF THE INVENTION

These and other objects of the present invention are achieved by an autonomous active clamp circuit which comprises rectifier means having inputs adapted to be coupled to a voltage to be clamped, and controllable switch means coupled to the outputs of the rectifier means and responsive to a control signal for clamping the voltage applied to the rectifier means when the controllable switch means is on. Circuit means are provided for generating the control signal which turns the controllable switch means on when the voltage exceeds the predetermined value and thereafter turns the controllable switch means off when the current flowing in the controllable switch means is substantially zero.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIG. 1 is a diagram showing the active clamp circuit of the present invention connected to an inductive load.

FIG. 2 is a schematic diagram showing the active clamp circuit of FIG. 1 in greater detail.

DETAILED DESCRIPTION OF THE INVENTION

Referring now to the drawings, FIG. 1 shows a clamp 20 connected across an inductive load 11. Inductive load 11 is supplied by ac source 10 through a series switch 12. Series switch 12 typically comprises a controlled semiconductor switching device connected to the outputs of a diode bridge. Inductive load 11 may be any inductive load for which it is desired to clamp load voltage.

Clamp 20 is shown to be autonomous, i.e. it operates independently of series switch 12. Specifically, clamp 20 should 1) close when the voltage across it exceeds some value substantially above peak line voltage, 2)

conduct with a low voltage drop and 3) open in substantially zero time when the current going through it reaches zero. It is noted that current through the clamp will normally go to zero before the clamp acts as a short circuit to ac source 10, allowing the clamp to open before the line is short circuited by the clamp. Assuming that a current $i_a$ is flowing in inductive load 11 in the direction shown in FIG. 1 ween switch 12 opens, the magnitude of the voltage across inductor 11 will rise until clamp 20 conducts, resulting in the current $i_b$ (initially equal in magnitude to $i_a$ at the instant the clamp becomes conductive) flowing as shown. If switch 12 remains open long enough, the current $i_b$ will extinguish and clamp 20 will open. If switch 12 closes before $i_b$ extinguishes, then ac source 10 will normally still be on the same half cycle as when switch 12 opened. Thus, the voltage of ac source 10 will oppose flow of current $i_b$ and then $i_b$ will quickly reduce to zero, allowing clamp 20 to open.

Clamp circuit 20 is shown in detail in FIG. 2. A diode bridge rectifier comprised of diodes 21a–21d and having inputs 22 and 23 as shown is connected across inductive load 11. An insulated gate transistor (IGT) 26 is connected to positive output terminal 24 and negative output terminal 25 of the diode rectifier. A zener diode 27 is connected between the IGT gate and the IGT emitter to clamp the gate voltage. Alternatively, the switching device 26 may comprise a power field effect transistor (FET) or gate turn off thyristor (GTO). In another embodiment of the invention, a complementary blocking field effect device may be placed directly across inductive load 11, thus replacing the diode bridge and its losses. One example of such a device is the BLS100 bilateral switch available from Siliconix of Santa Clara, Calif. The remainder of the circuit shown in FIG. 2 controls the gate of IGT 26 in order to render conductive, or turn on, IGT 26 (or a complementary blocking device) when the voltage across it exceeds a predetermined value and quickly to render it nonconductive, or turn it off, when the current going through it becomes substantially zero.

A regulated dc power supply 29 for supplying the electronics of active clamp circuit 20 is comprised of a diode 30, resistors 31 and 33, a capacitor 32 and a zener diode 34. The regulated dc voltage $+V$ is provided at terminal 35 with respect to ground 36. Regulated dc power supply 29 contributes to the autonomy of clamp circuit 20 since the clamp is not dependent on any other dc source. Thus, clamp 20 may then be wholly contained in an appropriately configured medium or high voltage integrated circuit which implements a circuit equivalent to the circuit described herein.

A first comparator 40 determines if the ratioed voltage across IGT 26 has exceeded a predetermined value. Thus, the voltage across IGT 26 reduced by a voltage divider comprised of resistor 43 and potentiometer 44 is provided to the noninverting input of comparator 40. A constant dc voltage from terminal 35 through a resistor 41 and regulated by a zener diode 42 is provided to the inverting input of comparator 40. Thus, when the voltage from the output of potentiometer 44 exceeds the voltage across zener diode 42, indicating that the voltage across inductive load 11 has exceeded a predetermined value, the output signal of comparator 40 rises to a high level, producing an over-voltage signal. A resistor 45 is a pullup resistor for comparator 40. Comparator 40 may be part of an integrated circuit such as the CA3290A available from RCA Corporation.

The output of comparator 40 is coupled to the clock input CLK of a flip-flop 70. Flip-flop 70 may comprise, for example, the 4013B integrated circuit available from RCA Corporation. The D input of this D flip-flop is connected to a positive bias voltage provided by $+V$ so that the rising edge of the over-voltage signal from comparator 40 toggles the flip-flop to give a positive drive to the gate of IGT 26. Thus, a high output signal at the Q terminal of flip-flop 70 provides a control signal through a coupling resistor 71, which turns IGT 26 on, resulting in clamping action.

A second comparator 50 monitors voltage across IGT 26 in order to remove clamping action when the voltage across IGT 26 goes to zero, i.e. current through IGT 26 goes to zero. A pair of series-connected diodes 55 and 56 are coupled to the dc supply voltage $+V$ through a resistor 57. A voltage of two diode drops modified by a potentiometer 54 is supplied to the noninverting input of comparator 50. A capacitor 58 is connected between the output of potentiometer 54 and ground in order to provide noise filtering. The inverting input of comparator 50 is provided with the source-to-emitter voltage of IGT 26 reduced by a voltage divider comprised of resistors 51 and 52. A zener diode 53 clamps the voltage provided to the inverting input of comparator 50 to a maximum value. A pullup resistor 60 is coupled to the R input of flip-flop 70 through a diode 61. Feedback resistor 59 allows hysteresis adjustment.

When a current zero in IGT 26 is detected by comparator 50 (the voltage at the inverting input of comparator 50 falling below the voltage at the non-inverting input), the output signal of comparator 50 goes high, producing a zero current signal and thus resetting flip-flop 70 and turning off the control signal from the Q output of flip-flop 70. This removes the gate drive from IGT 26. The R input of flip-flop 70 is an asynchronous input, thus allowing for the resetting of flip-flop 70 as soon as a current zero in IGT 26 is detected. The S and $V_{SS}$ inputs of flip-flop 70 are connected to ground.

It is desirable to stretch the zero current signal from comparator 50 to insure that flip-flop 70 ignores small transient voltage oscillations which might re-energize IGT 26 and cause it to short across ac source 10. The zero current signal from comparator 50 is stretched by a monostable multivibrator or one-shot 80 in pulse stretcher 79. One-shot 80 may comprise an integrated circuit such as CD4098B available from RCA Corporation. The positive edge triggered input TR+ of one-shot 80 is coupled to the output of comparator 50. DC voltage $+V$ is supplied to the $V_{DD}$ input of one-shot 80 and the inverse of $+V$ is provided to negative edge triggered input TR− and the $\overline{R}$ input of one-shot 80. A capacitor 81 is connected between the C and RC inputs of one-shot 80. The RC input of one-shot 80 is also coupled to DC voltage $+V$ through a resistor 82 and a potentiometer 83. When a zero current signal from comparator 50 is received, one-shot 80 is triggered, providing a high output signal at its output Q through diode 84 to the R input of flip-flop 70. The duration of the pulse provided by one-shot 80 is controlled by the value of capacitor 81, resistors 82 and 83 and dc voltage $+V$, as known for this commercially available device. Thus, flip-flop 70 is prevented from providing a high level of he control signal to IGT 26 for the duration of the pulse provided by one-shot 80.

Flip-flop 70 is further reset during power-up (i.e. when clamp 20 and inductive load 11 are first energized and capacitor 32 is not yet fully charged) by a power-up circuit 90. A field effect transistor (FET) 91 remains turned off until the voltage +V rises to a value high enough to cause the zener breakdown of zener diode 92 connected between +V and the gate of FET 91. The gate is further connected to ground through a resistor 94 and the drain of FET 91 is coupled to +V through a resistor 93. Thus, as long as FET 91 is turned off, a reset signal is provided through a diode 95 to flip-flop 70. When the dc supply voltage +V rises above the selected value (selected by virtue of the breakdown voltage of zener diode 92 plus FET threshold voltage), FET 91 conducts, removing the forward bias from diode 95. Thus, any one of the three reset functions described above is selected through an OR gate comprised of diodes 61, 84 and 95 connected to resistor 72.

From the foregoing it is apparent that an autonomous active clamp has been provided for clamping the voltage across an inductive load when the voltage across the inductive load exceeds a predetermined value and for removing clamping action when the current flowing in the clamp has reduced to zero. The described active clamp closes when the voltage across it exceeds some predetermined value above peak line voltage, conducts with a low voltage drop, and opens when the current going through it reaches zero. The present invention is particularly useful where the inductive load is a transformer, as for example, a motor or a fluorescent ballast, since the energy in the inductor can be converted into useful work when the load is disconnected from the ac source.

While preferred embodiments of the present invention have been shown and described herein, it will be obvious that such embodiments are provided by way of example only. Numerous variations, changes, substitutions, and partial and full equivalents will now occur to those skilled in the art without departing from the invention herein. Accordingly, it is intended that the invention be limited only by the spirit and scope of the appended claims.

What is claimed is:

1. An active clamp comprising:
   a source of induced voltage of any polarity to be clamped;
   controllable switch means connected to said source of induced voltage to be clamped and responsive to a control signal for clamping said induced voltage when said controllable switch means is conductive; and
      circuit means coupled to said controllable switch means for generating said control signal, said circuit means rendering conductive said controllable switch means when the magnitude of said induced voltage exceeds a predetermined value, thereafter said circuit means rendering nonconductive said controllable switch means when current flowing in said controllable switch means returns to zero, said circuit means comprising:
      DC supply means for providing regulated power for said circuit means;
      first comparator means coupled to said DC supply means and to said source of induced voltage for providing an over-voltage signal when the magnitude of said induced voltage exceeds said predetermined value;
      second comparator means coupled to said DC supply means and to said source of induced voltage for providing a zero current signal when the magnitude of said induced voltage is below a second predetermined value;
      flip-flop means for generating said control signal coupled to the outputs of said first and second comparator means, said flip-flop means being set upon receiving said over-voltage signal and being reset upon receiving a zero current signal; and
   zero current pulse stretching means including a monostable multivibrator having its trigger coupled to the output of said second comparator means and having its output coupled to said flip-flop means, said multivibrator generating a stretched pulse signal for keeping said flip-flop means reset during the duration of said stretched pulse.

2. An active clamp comprising:
   rectifier means having inputs adapted to be connected to a source of induced voltage of any polarity to be clamped;
   controllable switch means coupled to the outputs of said rectifier means and responsive to a control signal for clamping said induced voltage when said controllable switch means is conductive; and
   circuit means coupled to said controllable switch means for generating said control signal, said circuit means rendering conductive said controllable switch means when the magnitude of said induced voltage exceeds a predetermined value, thereafter said circuit means rendering nonconductive said controllable switch means when current flowing in said controllable switch means returns to zero, said circuit means comprising:
   DC supply means for providing regulated power for said circuit means;
   first comparator means coupled to said DC supply means and to said source of induced voltage for providing an over-voltage signal when the magnitude of said induced voltage exceeds said predetermined value;
   second comparator means coupled to said DC supply means and to said source of induced voltage for providing a zero current signal when the magnitude of said induced voltage is below a second predetermined value;
   flip-flop means for generating said control signal coupled to the outputs of said first and second comparator means, said flip-flop means being set upon receiving said over-voltage signal and being reset upon receiving a zero current signal; and
   zero current pulse stretching means including a monostable multivibrator having its trigger coupled to the output of said second comparator means and having its output coupled to said flip-flop means, said multivibrator generating a stretched pulse signal for keeping said flip-flop means reset during the duration of said stretched pulse.

3. An active clamp comprising:
   a source of induced voltage of any polarity to be clamped;
   controllable switch means connected to said source of induced voltage to be clamped and responsive to a control signal for clamping said induced voltage when said controllable switch means is conductive; and
   circuit means coupled to said controllable switch means for generating said control signal, said circuit means rendering conductive said controllable switch means when the magnitude of said induced voltage exceeds a predetermined value, thereafter said circuit means rendering nonconductive said controllable switch means when current flowing in said controllable switch means returns to zero;

said circuit means comprising:

DC supply means for providing regulated power for said circuit means;

first comparator means coupled to said DC supply means and to said source of induced voltage for providing an overvoltage signal when the magnitude of said induced voltage exceeds said predetermined value;

second comparator means coupled to said DC supply means and to said source of induced voltage for providing a zero current signal when the magnitude of said induced voltage is below a second predetermined value; and flip-flop means for generating said control signal coupled to the outputs of said first and second comparator means, said flip-flop means being set upon receiving said over-voltage signal and being reset upon receiving a zero current signal.

4. The active clamp recited in claim 3 wherein said circuit means further comprises:

power-up means coupled to said DC supply means and to said flip-flop means for keeping said flip-flop means reset whenever the DC voltage provided by said DC supply means is below a selected value.

5. An active clamp comprising:

a source of induced voltage of any polarity to be clamped;

controllable switch means connected to said source of induced voltage to be clamped and responsive to a control signal for clamping said induced voltage when said controllable switch means is conductive;

circuit means coupled to said controllable switch means for generating said control signal, said circuit means rendering conductive said controllable switch means when the magnitude of said induced voltage exceeds a predetermined value, thereafter said circuit means rendering nonconductive said controllable switch means when current flowing in said controllable switch means returns to zero; and a diode bridge rectifier for coupling said source of induced voltage to said controllable switch means;

said controllable switch means comprising an IGT, the collector of said IGT being coupled to the positive output of said rectifier, the emitter of said IGT being coupled to the negative output of said rectifier, and the gate of said IGT receiving said control signal.

6. An active clamp comprising:

rectifier means having inputs adapted to be connected to a source of induced voltage of any polarity to be clamped;

controllable switch means coupled to the outputs of said rectifier means and responsive to a control signal for clamping said induced voltage when said controllable switch means is conductive; and circuit means coupled to said controllable switch means for generating said control signal, said circuit means rendering conductive said controllable switch means when the magnitude of said induced voltage exceeds a predetermined value, thereafter said circuit means rendering nonconductive said controllable switch means when current flowing in said controllable switch means returns to zero;

said circuit means comprising:

DC supply means for providing regulated power for said circuit means;

first comparator means coupled to said DC supply means and to said source of induced voltage for providing an overvoltage signal when the magnitude of said induced voltage exceeds said predetermined value;

second comparator means coupled to said DC supply means and to said source of induced voltage for providing a zero current signal when the magnitude of said induced voltage is below a second predetermined value; and flip-flop means for generating said control signal coupled to the outputs of said first and second comparator means, said flip-flop means being set upon receiving said over-voltage signal and being rest on receiving a zero current signal.

7. The active clamp recited in claim 6 wherein said circuit means further comprises:

power-up means coupled to said DC supply means and to said flip-flop means for keeping said flip-flop means reset whenever the DC voltage provided by said DC supply means is below a selected value.

* * * * *